US008645350B2

(12) United States Patent
Greene

(10) Patent No.: US 8,645,350 B2
(45) Date of Patent: Feb. 4, 2014

(54) DICTIONARY COMPILATIONS

(75) Inventor: Andrew Marc Greene, Newton, MA (US)

(73) Assignee: Adobe Systems Incorporated, San Jose, CA (US)

( * ) Notice: Subject to any disclaimer, the term of this patent is extended or adjusted under 35 U.S.C. 154(b) by 589 days.

(21) Appl. No.: 12/172,120

(22) Filed: Jul. 11, 2008

(65) Prior Publication Data

US 2010/0011016 A1  Jan. 14, 2010

(51) Int. Cl.
*G06F 17/30* (2006.01)

(52) U.S. Cl.
USPC ............................. 707/706; 707/758

(58) Field of Classification Search
USPC ................... 707/706, 999.3, 758
See application file for complete search history.

(56) References Cited

U.S. PATENT DOCUMENTS

| | | | | |
|---|---|---|---|---|
| 4,933,882 | A * | 6/1990 | Molnar et al. | 702/33 |
| 5,355,473 | A * | 10/1994 | Au | 1/1 |
| 5,535,120 | A * | 7/1996 | Chong et al. | 704/3 |
| 6,298,321 | B1 * | 10/2001 | Karlov et al. | 704/10 |
| 6,470,347 | B1 * | 10/2002 | Gillam | 1/1 |
| 6,760,695 | B1 * | 7/2004 | Kuno et al. | 704/9 |
| 7,222,067 | B2 | 5/2007 | Glushnev et al. | |
| 7,644,115 | B2 * | 1/2010 | Granger | 708/204 |
| 7,685,554 | B1 * | 3/2010 | Kelly et al. | 716/17 |
| 7,877,399 | B2 * | 1/2011 | Lwo | 707/758 |
| 2005/0149471 | A1 * | 7/2005 | Lassalle | 707/1 |
| 2006/0004744 | A1 * | 1/2006 | Nevidomski et al. | 707/4 |
| 2006/0122983 | A1 * | 6/2006 | King et al. | 707/3 |
| 2006/0129536 | A1 * | 6/2006 | Foulger et al. | 707/3 |
| 2006/0271573 | A1 * | 11/2006 | LeTourneau | 707/100 |
| 2006/0293880 | A1 | 12/2006 | Elshishiny et al. | |
| 2007/0043714 | A1 * | 2/2007 | Stanton et al. | 707/4 |
| 2007/0050183 | A1 * | 3/2007 | Kao et al. | 704/3 |
| 2007/0282832 | A1 * | 12/2007 | Herley et al. | 707/6 |
| 2009/0171953 | A1 * | 7/2009 | Morris et al. | 707/6 |

* cited by examiner

*Primary Examiner* — Robert Beausoliel, Jr.
*Assistant Examiner* — Noosha Arjomandi
(74) *Attorney, Agent, or Firm* — Schwegman Lundberg & Woessner, P.A.

(57) ABSTRACT

Apparatus, systems, and methods operate to obtain data from a first array constructed from a directed acyclic graph formed as a prefix tree having key strings associated with a plurality of interconnected nodes, including branch nodes coupled via branches to sibling nodes and child nodes. Reference numbers are assigned to nodes in a monotonic progression as the prefix tree is traversed along the plurality of nodes. Sibling nodes are assigned reference numbers before child nodes, and child nodes are assigned reference numbers according to the order of appearance of key string characters. The first array comprises the key strings ordered according to the reference numbers. A second array can be formed as a linear searchable index derived from data in the first array, with elements of the second array comprising the reference numbers. Additional apparatus, systems, and methods are disclosed.

21 Claims, 7 Drawing Sheets

DICTIONARY COMPILATIONS

LIMITED COPYRIGHT WAIVER

A portion of the disclosure of this patent document contains material which is subject to copyright protection. The copyright owner has no objection to the facsimile reproduction by anyone of this patent disclosure, as it appears in the Patent and Trademark Office patent records, but otherwise reserves all copyright rights whatsoever. Copyright 2008 Adobe Systems Incorporated.

BACKGROUND

Many spell-check dictionaries represent words as a list of strings, sometimes with linguistic relationships represented by affix operations. For example, given the English word "party" and the information that the rule "some words ending in -y are pluralized by replacing -y with -ies" applies to this word, the validity of the word "parties" can be deduced. However, to check the spelling of a word, the most fundamental operation is simply to determine whether a given sequence of characters (e.g., a word in the English language) appears in the set of words included in a dictionary.

Simplistically, this type of dictionary might be modelled as a decision tree in which the first node represents the start of every legal word, and each node has one or more outgoing paths corresponding to a single legal character in the next position in the word, or a legal "end of string" state. However, this representation does not utilize memory very efficiently, nor lend itself to rapid search performance.

BRIEF DESCRIPTION OF DRAWINGS

Some embodiments are illustrated by way of example, and not limitation, in the figures of the accompanying drawings, in which.

DETAILED DESCRIPTION

Introduction

Figure 1:
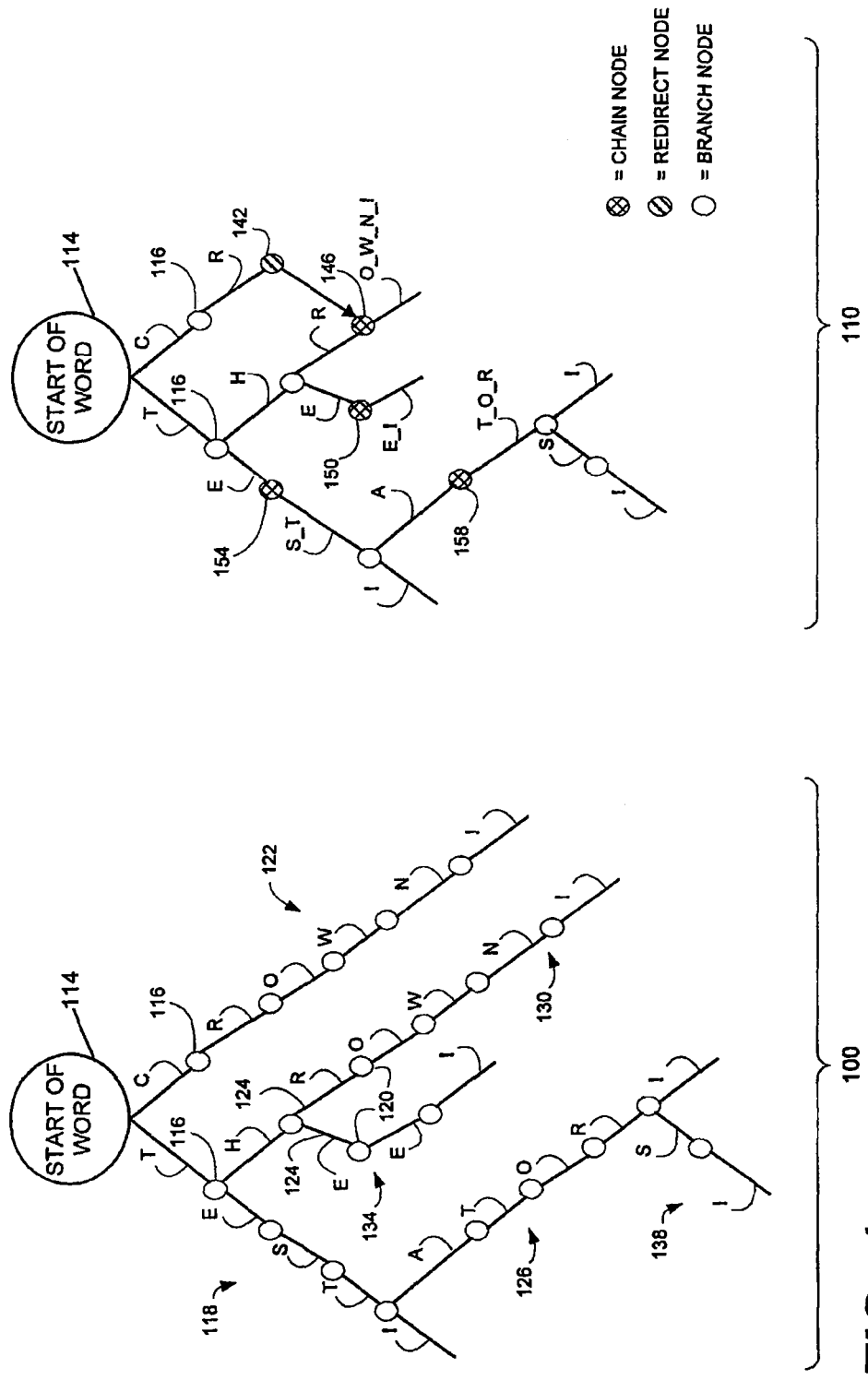
FIG. 1 illustrates the transformation of a tree according to various embodiments of the invention.

The storage space used by dictionaries can be reduced, and search performance increased, by transforming character trees into a set of arrays. For example, characters from a tree can be grouped together and stored in a linear string array that is searched as a directed acyclic graph (DAG). The string array can be compressed for efficient disk storage or transmission to other locations. Using reference numbers that are selectively assigned to nodes of the tree, an index array can be derived from the tree and utilized as an index into the string array, so that relatively rapid searching performance is also realized.

DEFINITIONS

For the purposes of this document, a "directed acyclic graph" or "DAG" is a directed graph with no directed cycles. That is, for any vertex, there is no nonempty directed path that starts and ends on the same vertex. A source is a vertex with no incoming edges, while a sink is a vertex with no outgoing edges. A finite DAG has at least one source and at least one sink. The depth of a vertex in a finite DAG is the length of the longest path from a source to that vertex, while its height is the length of the longest path from that vertex to a sink. The length of a finite DAG is the length (e.g., number of edges) along the longest directed path. It is equal to the maximum height of all sources and equal to the maximum depth of all sinks.

The term "electronic content" includes any digital data that may be presented to a user (e.g., visually or audibly presented), such as an electronic document, a drawing file, a media stream, a web page, a hypertext document, an image, digital video or a video recording, digital audio or an audio recording, animation, a markup language document, such as a HyperText Mmarkup Language (HTML) or eXtensible Markup Language (XML) document, a form having blank components to accept entered data, or data describing the application of a graphical user interface (GUI).

Documents and drawing files may be organized according to a page descriptive format, which includes a portable document format, where "portable document format" means a device-independent and display resolution-independent fixed-layout document format, including the text and fonts, images, and graphic paths associated with the document. The format may comprise a representation of a two-dimensional document, or a three-dimensional document. An example of a commercially available portable document format (PDF) is the format described in "PDF Reference", sixth edition, ADOBE® Portable Document Format, Version 1.7, November 2006.

A "content element" includes any part of electronic content that is defined or discernable as a part. For example, a content element may be automatically discerned from a characteristic of the content element itself (e.g., a word or paragraph of an electronic document, or a file format designation) or may be manually defined by a user (e.g., a user-selected collection of words in an electronic document, a user-selected portion of a digital image). Examples of content elements include portions of a page-descriptive document or other electronic document, such as pieces of electronic text, drawing objects, and other material within an electronic document, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by users within electronic content, including instances of scripted and non-scripted dynamic content and the like.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). Modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or a computational object to achieve a particular function, operation, processing, or procedure.

A "radix tree" is a space-optimized trie where each node with only one child is merged with its child.

The term "rendering" used as a verb includes presenting or making accessible electronic content or content elements to be perceived, viewed, or otherwise experienced by a user, or made available for further processing, such as, for example, searching, digesting, printing, analyzing, distilling, or transforming by computational processes that may not include processing the intrinsic data structure describing the electronic content or content element.

The term "rendering" used as a noun includes human-perceivable representations of data that is within a machine and perception-specialized organizations of data defining such representations. For example, a rendering may include a pattern of human-perceivable matter or energy presented on an output device (e.g., a display) by a machine, as well as the organization of data within a machine that defines such patterns. For example, such organizations of data may include the electronic configuration of a memory used by a graphics display processor, a file containing drawing objects from which a rendering of a drawing can be made, or a file containing an audio segment suitable for playing via an audio system of a computer.

The term "rendering module" may be taken to include systems, applications, and mechanisms for rendering or presenting electronic content to a user, including the presentation of content elements such as text, graphics, form element renderings and other electronic content elements. An example of a rendering module includes a web browser component (e.g., Microsoft Internet Explorer) or other component to render electronic content such as HyperText Markup Language (HTML) pages. Other examples of rendering modules include the ADOBE® Acrobat® electronic publishing program, and the ADOBE® Illustrator® drawing program.

The term "rendering program" includes applications for rendering or presenting dynamic content to a user. An example of a rendering program is the ADOBE® FLASH® Player 9 runtime software application. In many embodiments, a rendering module interacts with a rendering program to render dynamic content.

A "trie" or "prefix tree" refers to an ordered tree data structure that is used to store an associative array where the keys are usually character strings. The position of a node in the tree denotes the key with which it is associated. All the descendants (i.e., children) of any one (parent) node have a common prefix of the string associated with that node, and the root of the tree is associated with the empty string. Key string values are not necessarily associated with every node.

Additional definitions are included below. These definitions are introduced along with the description of various embodiments.

Methods

Several operations can be applied to transform a simplistic character tree into a searchable string array. For example, in some embodiments, the transformation is accomplished by applying a set of rules.

Rule 1: Any (parent) node having descendants (child nodes) that are identical to the descendants of another node can be marked to "redirect" tree traversal activity to the other node before the next character is taken as an input, converting the tree into a DAG.

Rule 2: Any sequence of nodes that have only one character as their outcome (e.g., that do not branch into multiple characters) can be combined into a single multi-character node.

Rule 3: The nodes of the DAG can be assigned an ordered series of reference numbers for later storage as a linear array of strings. An index can be computed at runtime to allow the string array to be traversed as though it were a tree. Thus, the string array can be used as a DAG, but is not represented as such in memory.

Rule 4: The list of characters at each node (e.g., stored in each string array element) can be sorted prior to storage so that characters with a higher frequency of use appear first.

Rule 5: A final element can be added to the string array that includes one of each character that appears in the string array, for use in spell-check activities and constructing a list of suggestions for correcting misspelled words.

FIG. 1 illustrates the transformation of a tree 100 according to various embodiments of the invention. The simple character tree 100 begins with a start of word node 114. Branching off of the node 114 are two branches, associated with the exit characters "T" and "C" respectively, and leading to the top-level branch nodes 116.

It should be noted that the tree 100 is shown with sufficient structure to illustrate the construction of a dictionary that includes the words "TEST", "TESTATOR", "TESTATORS", "THEE", "THROWN", and "CROWN". It is limited in size to facilitate understanding on the part of the reader, but the size shown is not meant to be otherwise limiting.

For example, although only the exit characters "T" and "C" are shown to be associated with the branches and top-level nodes 116 branching off of the start of word node 114 in this example, those of ordinary skill in the art will realize that a tree used in conjunction with the English language might have on the order of sixty (60) to seventy (70) such top-level nodes 116 because the tree 100 can be constructed to distinguish between words that are properly spelled using either lower case or upper case letters (e.g., proper nouns). For example, the word "Massachusetts" is misspelled if it begins with a lower case character "m". Thus, two complete sets of alphabetic characters (one lower case and one upper case) may branch off of the node 114. Therefore, when a complete dictionary is implemented, there will normally be many more nodal chains than the few that are shown in FIG. 1 (i.e., nodal chains 118, 122, 126, 130, 134, and 138).

In most embodiments, there are as many top-level nodes 116 as there are characters that appear as first letters in the words for a given dictionary. Lower-level nodes may be used to accommodate characters that are never used to begin a word, such as the hyphen "-" character used in the word "father-in-law".

In FIG. 1, "branch" nodes are shown as ovals comprising collations of legal exit characters associated with a higher-level node. For example, nodes 120 are branch nodes associated with the exit character "E" and "R" coupled via branches 124 to the higher level node associated with the exit character "H" in the nodal chain 130.

"Redirect" nodes are designated when Rule 1 is applied, and as explained previously, are nodes designated to re-direct tree traversal operations from the redirect node to other nodes in the tree. Thus, node 142 serves as a redirect node to the node associated with the exit character "R" in the tree 110.

"Chain" nodes are designated when Rule 2 is applied, being nodes associated with key strings that have more than one alphabetic character or at least one alphabetic character and an indicator for a terminal node. Thus, nodes 146, 150, 154, and 158 are chain nodes.

"Terminal" nodes, which indicate the end of words, may be designated using any convenient indicator. In this figure, key strings including the exclamation point character "!" are used to designate terminal nodes. Thus, some nodes in the tree 110 serve as both chain nodes and terminal nodes. Branch nodes may also serve as terminal nodes.

Applying Rules 1 and 2 transforms the tree 100 into the tree 110. For example, after the application of Rule 1, a redirect node 142 is designated, so that after the top-level node 116 associated with the exit character "C" is encountered during traversal activity (e.g., when searching as part of a spell-check operation), subsequent traversal activity will be redirected to the branch node along the nodal chain 130 associated with the exit character "R". After application of Rule 2, chain nodes associated with the key strings "ST", "TOR", "E!", and "OWN!" are designated.

Figure 2:
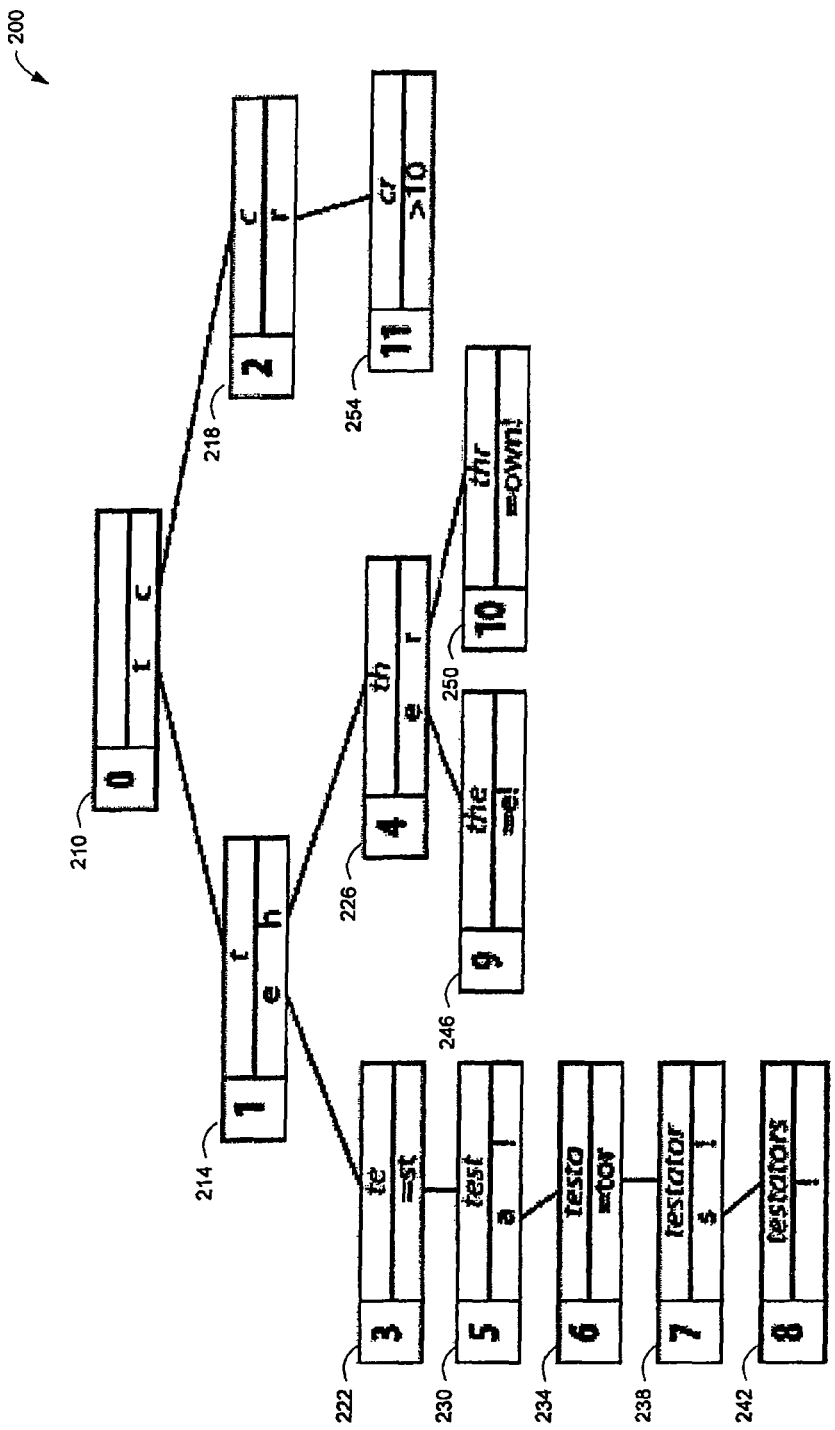
FIG. 2 illustrates a prefix tree constructed as a directed acyclic graph with reference numbers assigned according to various embodiments of the invention.

FIG. 2 illustrates a prefix tree 200 constructed as a DAG with reference numbers assigned according to various embodiments of the invention. In this embodiment, each node 210, . . . , 254 is shown as having three parts: an assigned reference number on the left-hand side, an upper portion indicating the concatenation of characters assembled by traversing the tree 200 up to that node, and a lower portion indicating the key strings having legal exit characters associated with (child) branch nodes coupled to that (parent) node.

Branch nodes are indicated by alphabetic characters in the lower portion of the nodes. The characters are equally spaced if there is more than one. Chain nodes are indicated by the presence of an equals sign character "=" as part of the key string. Redirect nodes are indicated by the presence of a greater-than character ">" as part of the key string. Characters other than "=" and ">" can be used to indicate the presence of chain nodes and redirect nodes, respectively, if desired.

It should be noted that key strings associated with nodes in the tree comprise characters that are to be found next as traversal continues along the branches of the tree. The composition of the key strings varies. For example, key strings for branch nodes are the concatenation of branch node exit characters. Key strings for chain nodes include "=" followed by the substring of the characters to be found next. For redirect nodes, the key string includes ">" followed by a string representation of the destination node's reference number.

As shown in FIG. 2, node 210 has been assigned the reference number 0, and the spaced-apart characters "T" and "C" indicate that the (child) branch nodes 214, 218 coupled to (parent) node 210 are associated with exit characters "T" and "C", respectively. Thus, the node 210 is associated with the key string "TC". Similarly, node 214 has been assigned the reference number 1, and the spaced-apart characters "E" and "H" indicate that the child nodes 222, 226 coupled to (parent) node 214 are associated with the exit characters "E" and "H", respectively. Thus, the node 214 is associated with the key string "EH".

To generate the tree 200, Rule 3 has been applied to assign reference numbers 0, 1, . . . , 10, 11 to each of the nodes 210, . . . , 254 that are in turn associated with key strings in the tree 110 of FIG. 2. The reference numbers 0 . . . 11 are assigned as follows:

The root node 210 is assigned reference number "0"

The current (parent) node's children are assigned consecutive reference numbers, beginning with the next available integer (e.g., "1" if only "0" has been assigned to this point) in the order in which their branch character appears in the node's string representation. Terminal exit characters, indicated using an exclamation point, have no children. A chain node (as a parent node) is coupled to exactly one child node, unless its associated key string ends with an exclamation point. In that case, the chain node is not coupled to any child nodes. Redirect nodes always have no child nodes.

Once the (parent) node's child nodes have been assigned reference numbers, the child nodes are recursed, in turn, as parent nodes to assign additional reference numbers to their children in the same order as the reference numbers were assigned to them as child nodes.

Thus, reference numbers are assigned almost according to a depth-first traversal, except that when a particular node is assigned a reference number, its siblings are assigned reference numbers as well, before traversal of the tree (and further reference number assignment) at the next lower level continues. The tree 200 can be transformed into a string array based on the assigned reference numbers. Some trees 200 may comprise radix trees.

Figure 3:
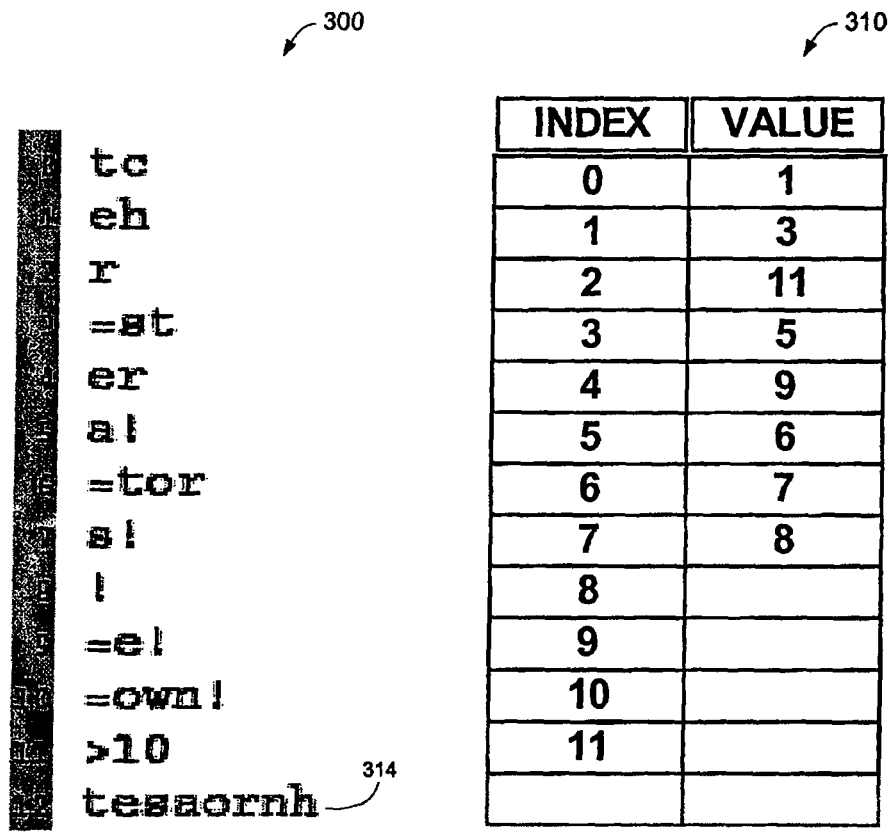
FIG. 3 illustrates a key string array 300 and an index array 310 according to various embodiments of the invention.

FIG. 3 illustrates a key string array 300 and an index array 310 according to various embodiments of the invention. The key string array 300 includes an element for each of the nodes of the tree from which it is derived. Thus, the array 300 has elements 0 . . . 11 that are used to store key strings associated with the corresponding nodes from the tree 200 of FIG. 2.

Branch nodes are stored as a collation comprising the legal exit characters from each node. While the order of the characters in each collation of key string characters is otherwise unimportant, a performance gain may be possible if the characters are ordered such that those which appear more frequently, according to one or more selected metrics, are presented first in the collation.

Chain nodes are stored using a key string that contains an equals sign followed by the relevant alphabetic character sequence. Redirect nodes are stored using a key string that includes a greater-than sign followed by a representation of the array element number to which redirection should occur.

While shown in the examples herein using radix 10, reference numbers may be assigned using any desired radix. For example, using a higher radix than 10 may result in more efficient file compression when the array 300 is stored as a compressed set of data. Thus, some embodiments use a radix having the number of alphabetic characters plus the number of unique numeric digits, such as radix 36 in the English language. Some embodiments make use of radix values from 10 to 40.

The file representation of the array 300 may comprise the list of key strings written out in the order of node reference numbers, one per line. The node reference numbers themselves need not be written to the file (e.g., they may simply correspond to line numbers within the file). In this way, the structure of the tree from which the array 300 is derived is not explicitly saved.

In some embodiments, a non-repeating list 314 of all characters used in the file is appended to the file representing the array 300. Here, the list 314 is shown as the final element (element 12) of the array 300. The list 314 can be useful in a number of ways. For example, it may be used in constructing suggested corrections for misspelled words.

Once the file is constructed from the array 300, it can be compressed using any of the algorithms known to those of ordinary skill in the art before it is stored. Such compression algorithms include the zlib deflate mechanism and other variations of Lempel-Ziv compression methods, among others.

Because the intermediate computation in compiling the word list reduces the word list to a DAG, prefixes may be more efficiently represented. Because common end sequences are combined via redirect nodes, suffixes may also be more efficiently represented. Thus, some embodiments may dispose of linguistic analysis to select affixes. The operations described herein can be applied to the word list of any character-based language without language-specific optimization, if desired.

To further increase the speed of traversal and search operations, the alphabetic characters in key strings associated with branch nodes may be ordered such that the more common characters appear first. Character frequency may be determined according to frequency of appearance in a language dictionary, in media outlets, technical journals, a set of books, magazines, or text on the Internet, among others.

The order of characters may also be based on the characters which have appeared prior to encountering a particular node, that is, context based. For example, if "T" and "H" have already been encountered in a tree-traversal operation, the next most likely character might be an "R", as shown in FIG. 1.

Once the data associated with the string array 300 has been compressed and stored, an index array 310 may be derived from it for efficient traversal. Based on the reference numbering scheme, when the file associated with the array 300 is read as an array of strings, an index array 310 can be efficiently created, such that each element represents the index of the first child of each node that has children. The remaining children occur in immediate sequence. Thus, when analyzing a node, the question to ask is "what is the position of the next test character in the current node's branch string?" If the answer is "none" then the word is misspelled. Otherwise, that position is added to the index of the first child node in the overall array 310 to determine the index of the next node in the traversal activity. If the next node key string starts with a greater-than sign, then the next node is a redirect node and traversal activity is redirected.

If the current node is associated with a key string that begins with an equals sign, the remaining characters of that node should be an exact match for the next substring of the word being tested. If there is such a match, then traversal continues using the index of the (parent) node's single child, advancing past the concatenation substring of the node to that point. If there is no match, then the word being tested is misspelled.

For example, referring now to FIGS. 2 and 3, if the tree 200 (as saved in the representation of array 300) is being traversed, and the traversal activity is currently halted at node 226 associated with the reference number "4", and the character "E" is encountered—which node is next in the traversal? This is determined by scanning the index array 310, which shows that the next index number (node) is "9". Thus, by assigning the reference numbers as noted previously, once the reference number of the first child is known, all of the rest are also known. For example, in this case, since the child node reference number is "9", all other children of the node assigned the reference number "4" will have reference numbers greater than "9", such as "10", "11", "12", and so on. Rather than in a depth-first traversal where the index of each child must be known, the various embodiments described herein can operate to narrow the index based on the reference number assigned to the first child of a parent node. In this way, the index array 310 is a collection of node numbers which allows for rapid retrieval of the node number of the first child of any given node. It should be noted that the index array 310 is not written or stored with the content of the "INDEX" column. This column is shown as a convenient reference for the reader so that the location within the array of the individual indices is more easily understood.

Since the index array 310 may be efficiently produced, it can be constructed whenever it is needed. For example, if the index array 310 is used for checking the spelling of words in conjunction with a word processing application program, the array 310 may be constructed and stored in memory when a user initiates execution of the application program, and then deleted from memory when the user is finished using the program. Similarly, the array 310 may be created every time a change in language is encountered, in different portions of a document, for example. Thus, many embodiments may be realized.

Figure 4:
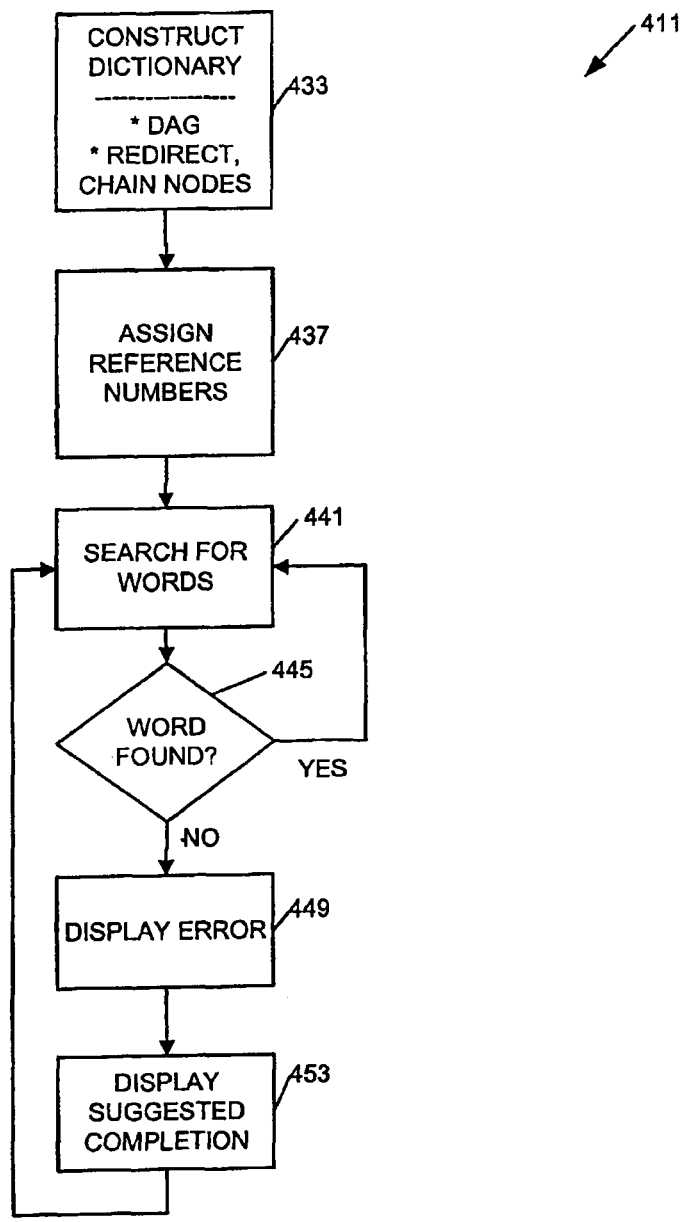
FIG. 4 is a flow diagram illustrating several methods according to various embodiments.

For example, FIG. 4 is a flow diagram illustrating several methods 411 according to various embodiments. In some embodiments, a computer-implemented method 411 to compile a dictionary by constructing a prefix tree may begin at block 433 with constructing a dictionary as a prefix tree having key strings associated with a plurality of nodes interconnected via branches. The plurality of nodes include at least one branch node coupled via some of the branches to sibling nodes of the branch node and child nodes of the branch node. The dictionary may comprise words taken from the English language, one or more non-English languages, and combinations of the two.

The prefix tree can be constructed as a prelude to constructing the key string array. Within the prefix tree there are three types of nodes: branch, chain, and redirect nodes. "Key strings" are strings of characters associated with each of the nodes, and interpretation of the key strings is governed by the first character in the string. For branch nodes, there is exactly one child node for each character in the key string (with the exception of a "termination character" (e.g., the exclamation point character "!" described previously), if present). Chain nodes (nodes in which a series of single-character branch nodes have been combined into a single node) have exactly zero or one child, depending on whether the termination character is present at the end of the key string associated with the chain node. Redirect nodes do not have child nodes—they merely operate to point to another node in the tree.

In some embodiments, constructing the dictionary comprises constructing the prefix tree as a DAG with at least one of the child nodes comprising a redirect node that is associated with one of the key strings. The redirect node is associated with a key string that includes a redirect indicator character and one of the references numbers assigned to another node of the plurality of nodes. In this way, searches may be redirected from the redirect node to the node assigned the reference number forming a portion of the key string associated with the redirect node.

In some embodiments, constructing the dictionary comprises constructing the prefix tree as a DAG with at least one of the child nodes comprising a chain node associated with one of the key strings. The key string associated with the chain node includes a plurality of alphabetic (and other) characters and the chain node is coupled to either one or zero additional child nodes by branches.

As noted previously, some nodes may be associated with key strings ordered according to the letter frequency found in the dictionary. Some nodes may be associated with key strings ordered according to the letter frequency found in newspapers. Some nodes may be associated with key strings ordered according to the letter frequency found in scientific journals. And some nodes may be associated with key strings ordered according to a character distribution that can be predicted based on the characters that have been encountered while traversing the tree, within a single text corpus.

Combinations of these orderings within a single tree are possible. Thus, in some embodiments, alphabetic characters within a first group of the key strings are ordered according to a first letter frequency (e.g., those found in the dictionary), and alphabetic characters within a second group of the key strings are ordered according to a second letter frequency (e.g., those found in a sampling of text found in a set of encyclopaedia). Many other arrangements and combinations can be made.

The method 411 may go on to include assigning reference numbers to the plurality of nodes in a monotonic progression as the prefix tree is traversed along the plurality of nodes at block 437. The sibling nodes are assigned reference numbers before assigning the reference numbers to child nodes, and the child nodes are assigned the reference numbers according to the order of appearance of characters in the key strings, as described previously.

The method 411 may include searching for words (e.g., as part of a document spell-check operation) in the prefix tree at block 441. If the word search at block 445 is successful, then the method 411 may continue with searching for more words at block 441.

If the word is not found at block 445, the method 411 may continue on to block 449 with displaying an error message to the user of a word processing application, for example, when a word in a document cannot be constructed by traversing the prefix tree along a path defined by the nodes and branches. Alternatively, or in addition, the method 411 may include displaying a suggested automatic completion of the word at block 453, and continue on to searching for more words at block 441 once the issue of proper word spelling is resolved.

As mentioned previously, suggestions for automated completion or correction of a particular word can be based upon characters included in a non-repeating list of dictionary characters that may be appended to the string array. If a word is misspelled, then other words in the dictionary are found which are similar to the misspelled word. For example, if the word "GRAPE" is mistakenly entered as "GRAP", and the characters in the final line of the string array file are stored in the order of most frequent appearance, time is saved by only searching for characters included in the dictionary, and searching for those characters that are used most frequently first.

In this case, since "GRAP" is not in the dictionary, there are several options available to suggest the correct word. One options is to try deleting each character in the word, one at a time (e.g., if an extra letter was entered). For example, the user may have meant to enter "RAP" or "GAP". Another option includes swapping adjacent letters in the event they have been transposed. A third option is, for each letter in the list, to replace each letter in the entered word. For example, the user may have meant to enter "TRAP". A fourth option is to insert each letter in the list, one by one, next to each of the letters in the word. For this example, the fourth option renders the correct spelling of the word "GRAPE". These operations are known to those of skill in the art as iterations of edits, distance one. If there is time, edits with a greater distance (e.g., distance two) may also be attempted.

Thus, the spelling of the misspelled word can be perturbed, and the result checked against the spelling of other words in the dictionary. If the result of a particular perturbation is not found, it is not reported. Still other embodiments may be realized.

Figure 5:
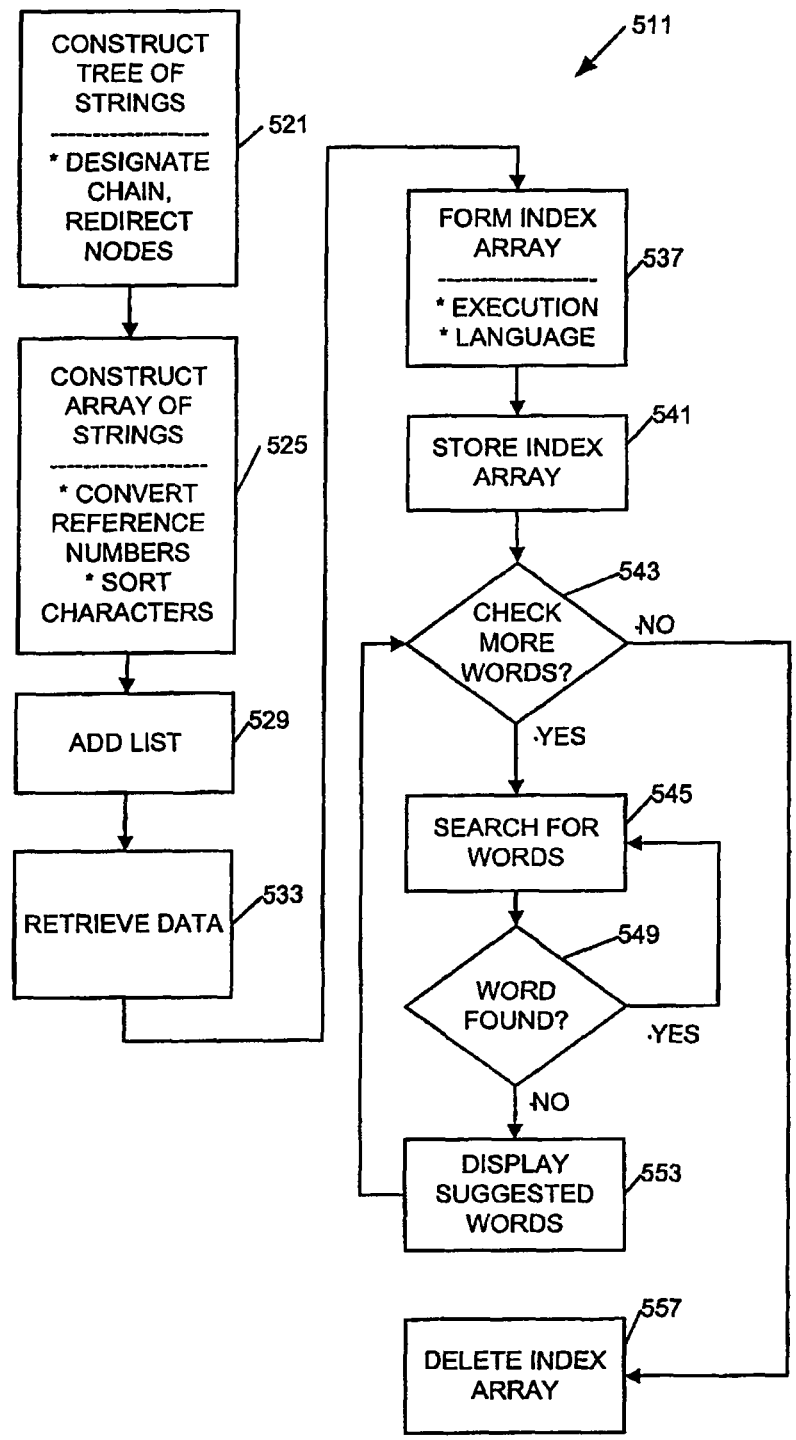
FIG. 5 is a flow diagram illustrating several additional methods according to various embodiments.

For example, FIG. 5 is a flow diagram illustrating several additional methods 511 according to various embodiments. For example, a computer-implemented method 511 to construct a string array and an index array may begin at block 421 with constructing a tree that has a plurality of nodes associated with key strings. In some embodiments, tree construction may comprise designating some of the plurality of nodes as chain nodes, using a chain node indicator character (e.g., an equals sign "=") in the key string associated with the chain node. A termination character (e.g., an exclamation point "!") may be included in the key string associated with the chain node as well. That is, some chain nodes are associated with key strings that include a chain node indicator and a termination character. Other nodes designated as chain nodes may be associated with key strings containing the chain node indicator, a single alphabetic character, and a termination indicator.

Constructing the tree at block 521 may include designating redirect nodes as well. Thus, one or more child nodes in the tree may comprise a redirect node that is associated with one of the key strings including a redirect indicator character and a reference number. The reference number is one that has been assigned to another node, and serves to direct traversal operations from the redirect node to the node that has that reference number (included in the key string associated with the redirect node) assigned to it.

The method 511 may include, at block 525, building the string array as a first array constructed from a DAG formed as a prefix tree having key strings associated with a plurality of nodes interconnected via branches. The prefix tree may comprise a plurality of nodes that include branch nodes coupled to child nodes and sibling nodes as described previously. The activity at block 525 may include sorting the characters in the key strings according to the frequency of their occurrence in a variety of media.

Reference numbers may likewise be assigned to the nodes of the prefix tree, such that the first array derived therefrom comprises the key strings ordered according to the reference numbers. When a redirect node has been designated, the reference number included in the key string associated with the redirect node may correspond to a line number of the string array where the key string associated with the node indicated by the redirect node is stored. In some embodiments, the reference numbers may be converted to a string representation having a radix of 10 to 40.

In some embodiments, the method 511 may comprise adding an element to the first array at block 529, wherein the element comprises a non-repeating list of characters, perhaps by appending the list to the first array. The list may include all characters in the dictionary, if desired.

The method 511 may go on to block 533 with retrieving data from the first array at block 533. The method 511 may continue with forming a second array at block 537 as a linear searchable index derived from the data, with some elements of the second array comprising one of the reference numbers. In some embodiments, each element of the second array may comprise one of the reference numbers. In some embodiments, the second array is sparse—some elements are empty and not used.

The second array, formed as an index array, is an array of indices that point to the lines of the first array, formed as a string array. In other words, the array of key strings constructed at block 525 is not itself an index.

To summarize, in most embodiments, there are three successive data representations: a DAG, a string array, and an index array. First, the DAG is formed, and reference numbers are assigned to the nodes of the DAG.

A string array is then constructed from the DAG. The output of the string array construction process is an array of strings, written out to a file. The process of forming a DAG, assigning reference numbers, and constructing a string array occurs once, and the string array can be used over and over again. Subscripts in the first array, or string array, correspond to the reference numbers assigned to the DAG nodes.

Each time an application begins execution, or when the user changes languages, the file containing the string array can be loaded, and the resulting array of key strings may be kept in memory with no additional manipulation of that key string array. A second, parallel index array is constructed whenever the file of key strings is loaded into the first array.

The second array has the same dimension as the first, not counting the non-repeating list element—if this is included in the array. For a given array subscript i, the integer stored at position i in the second array is the reference number (and thus the subscript position) of the first child node of the node whose reference number is i. The second array can be quickly constructed because of the novel manner in which reference numbers are assigned. This index array construction lends itself to improved memory usage and tree traversal speed compared to other dictionary implementations. A file for the index array may be created and optionally compressed for efficient transmission to another location, such as from a server to a remote client.

Thus, in some embodiments, the activity of forming a second array at block 537 may include forming the second array each time execution of a word processing application program is initiated, or language within the word processing application program is changed. The method 511 may continue on to block 541 with storing the second array in memory after initiating execution of an application program.

The method 511 may continue on to block 543 with determining whether more words are to be checked (e.g., for correct spelling). If so, then the method 511 may include continuing on to block 545.

Thus, the method 511 may include searching for a word (e.g., as part of a document spell-check operation) in the string array at block 545. If the word is found, then the method 511 may continue with searching for more words at block 545. Thus, the activity at block 545 may include searching for a word formed by concatenating alphabetic (and other) characters included in the key strings along a path defined by some of the plurality of nodes and the branches in the prefix tree.

If the word is not found at block 549, the method 511 may continue on to block 553 such that, upon failing to find the word, the activity at block 553 includes displaying a list of suggested words according to the non-repeating list of characters (at the end of the first array) by inserting possible missing characters and replacing possible mistaken characters with possible intended substitute characters. The possible missing characters and the possible intended substitute characters are found in the non-repeating list of the characters. Alternatively, or in addition, the method 511 may include displaying a suggested automatic completion of the word at block 553, and continue on to determining whether more words are to be checked at block 543 once the issue of proper word spelling is resolved.

If there are no more words to be checked, as determined at block 543, then the method 511 may go on to block 557 to include deleting the second array from memory about the same time as execution of the application program is terminated. For example, the application program used to initiate creation of the second array (index array) may comprise a word processing program, a database program, a browser, or some other application that makes use of exploring the content of a dictionary by traversing the first array (string array) according to the data contained in the second array.

It should be noted that the methods described herein do not have to be executed in the order described, or in any particular order. Moreover, various activities described with respect to the methods identified herein can be executed in iterative, repetitive, serial, or parallel fashion. Activities within various methods may also be combined, to include combination across the various figures used herein. Information, including parameters, commands, operands, and other data, can be sent and received in the form of one or more carrier waves.

Apparatus and Systems

Figure 6:
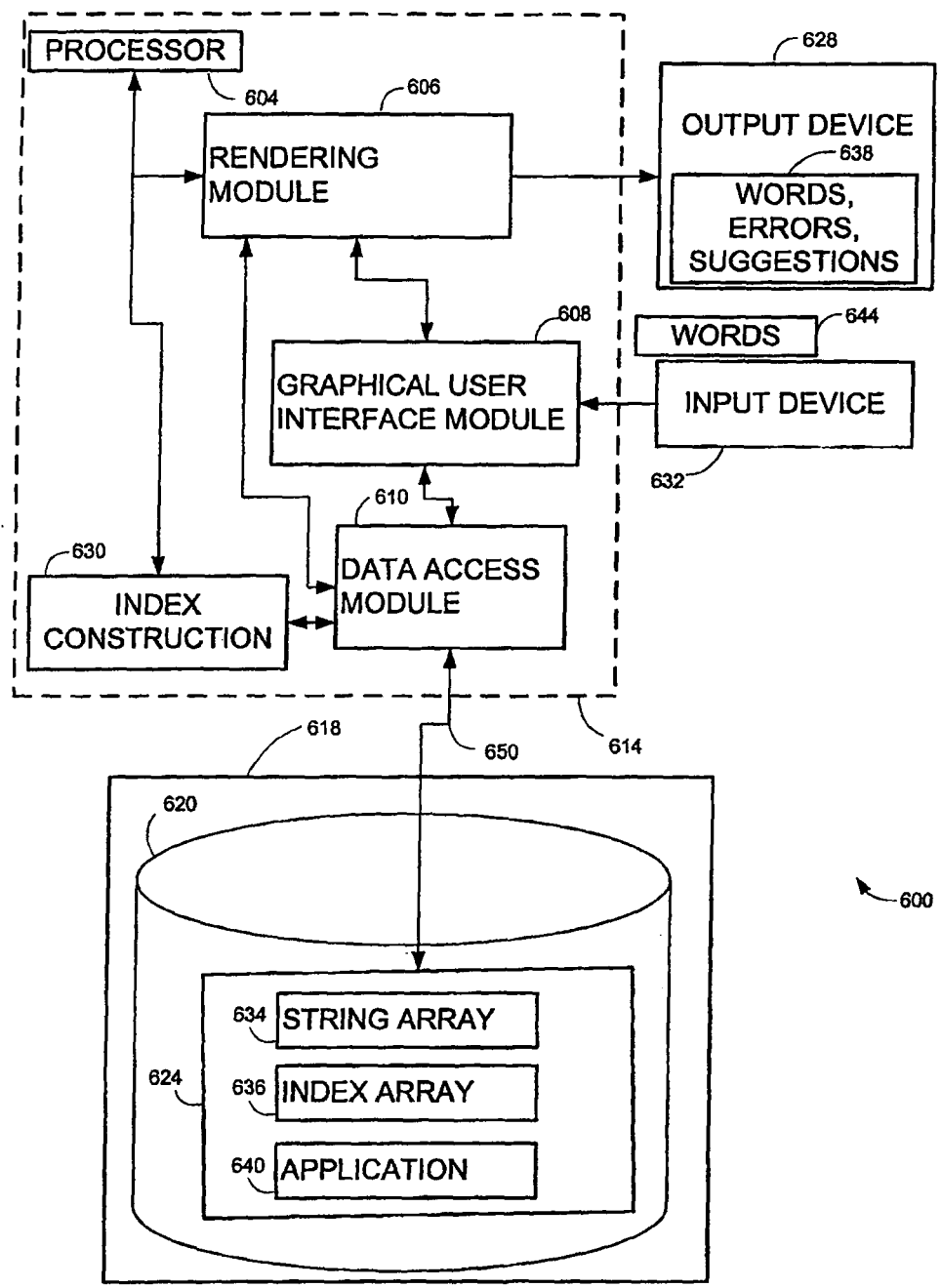
FIG. 6 is a block diagram of a system according to various embodiments.

FIG. 6 is a block diagram of a system 600 according to various embodiments. The system 600 may include a number of modules such as one or more processors 604, a rendering module 606, a graphical user interface (GUI) module 608 and a data access module 610. The rendering module 606 and the GUI module 608 may take the form of an integral module, or exist a separate modules, as shown. An index construction module 630 may also be included. These modules may be associated within a machine 614, such as a personal digital assistant (PDA), laptop, personal computer (PC), workstation, client, or server, as indicated by their containment within the dashed box.

In order to avoid obscuring the components of FIG. 6, connecting lines between each of the elements within the machine 614 have not been shown. However, those of ordinary skill in the art will understand that any of the individual elements shown to be located within the confines of the machine 614 may be operably coupled to any other element within the machine 614. Similarly, those of ordinary skill in the art will understand that any of the components shown to be located within the confines of the machine 614 may also be located outside the machine 614, and appropriately coupled to the machine 614 via wired or wireless networks or other interface mechanisms.

The data access module 610 may be used by the rendering module 606 to access a storage element 620, such as a database, a memory, a disk, or other storage device. The storage element 620 may be included within another machine 618, such as a server, and may operate to contain one or more items of electronic content 624, such as one or more string arrays 634, one or more corresponding index arrays 636, and one or more application programs 640. The data access module 610 may operate to read from and/or write electronic content 624 from the storage element 620, providing reading and writing services for the benefit of other system modules, including the GUI 608, the rendering module 606, the processor 604, and the index construction module 630.

The data access module 610 may be present in some embodiments, and absent in others. When present, the data access module 610 may operate as a mediator between the various components of the system 600 and the electronic content 624 stored in the storage unit 620. For example, the storage element 620 may be included in a remote server.

The rendering module 606 may be operably coupled to an output device 628, such as a display screen, printer, or loudspeaker, among others. This output device 628 may be used for presenting renderings of content elements included in the arrays 634, 636, or provided by the application programs 640. Rendering may take the form of displaying the content elements, including words, errors, and suggestions 638 received by an application 640 or generated by the application 640, and perhaps stored on the storage element 620, which may comprise a memory.

A GUI module 608 may be operably connected to the rendering module 606 and the data access module 610. The rendering module 606 may comprise a portable document format processing program in some embodiments.

The GUI module 608 may receive input from input devices 632 (e.g., a keyboard, a mouse, a trackball, voice recognizer, touch pad, touch screen, etc.), including user input comprising words 644 to be transmitted to a word processing application, among others. Thus, many embodiments may be realized.

For example, a system 600 to implement dictionary compilation for spell-checking words 644 may comprise an output device 628 in the form of a display, and an index construction module 630 to form a second array as a linear searchable index derived from a first array constructed from a DAG formed as a prefix tree having key strings associated with a plurality of nodes interconnected via branches. The first and second arrays can be constructed according to any of the methods describe herein. Thus, the system 600 may further include a rendering module 606 to display words 638 on the display after the words 644 have been checked for spelling against a concatenation of alphabetic characters included in key strings in the first array. The index construction module 630 can be a module that forms part of an application program 640, or a stand-alone program module, as shown.

In some embodiments, the system 600 comprises a user input device 632 and a processor 604 coupled to the display. The system 600 may further comprise one or more storage devices 620, such as a memory to store an application program 640 which, when executed by the processor 604, is used to receive the words 644 via the user input device 632. Thus, the system 600 may comprise a locally-stored, locally-executed option, with a disk or other storage device 620 to store a word processing program that is used to receive words 644 from a user when the program is executed.

In some embodiments, the system 600 includes a first machine 618, such as a server, to store at least one of the first (string) array 634 or the second (index) array 636. The system 600 may also include a second machine 614, such as a client, coupled to the server via a network 650, the client to receive the words 644 via a user input device 632 coupled to the client.

In some embodiments, the system 600 comprises a first machine 618, such as a server, to construct the first (string) array 634. The system 600 also comprises a second machine 614, such as a client, to form the second (index) array 636. In this case, the client is capable of being coupled to the server via a network 650, and the client can operate, as in the previous example, to receive the words 644 via a user input device 632 coupled to the client.

Thus, there are multiple locations in which the first and second arrays 634, 636 can be constructed and stored. For example, the arrays 634, 636 may be stored on a web server, along with an application, with each being downloaded on demand. The arrays 634, 636, and application 640, as separate components, may also be stored on separate servers, and brought together at a user client computer in memory managed by a web browser, without ever being written to local storage at the client. The client may be used to construct the second (index) array 636.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, still further embodiments may be realized.

Articles of Manufacture

Figure 7:
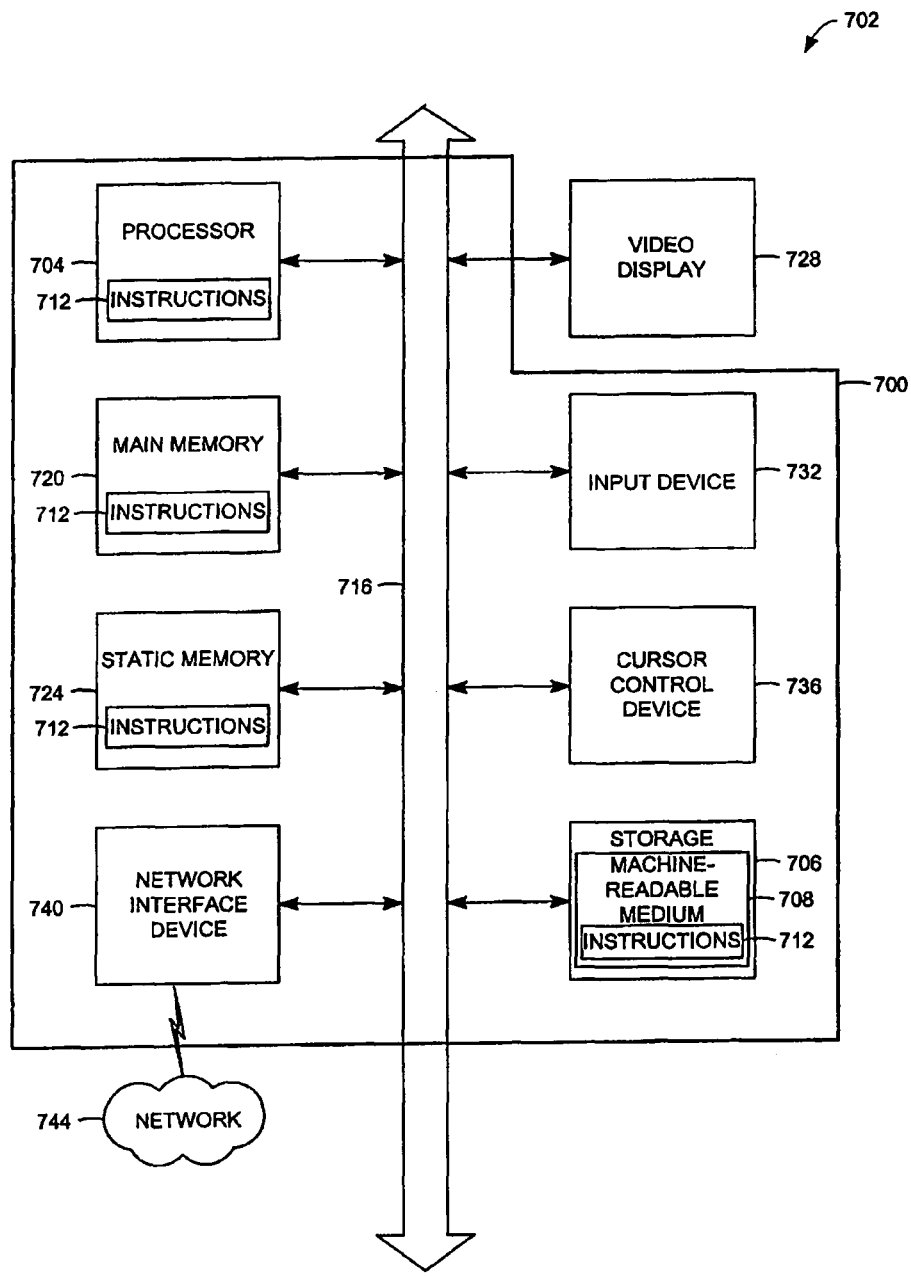
FIG. 7 is a block diagram of an article of manufacture, including a machine, according to various embodiments.

For example, FIG. 7 is a block diagram of an article 702 of manufacture, including a machine 700, according to various embodiments. The article 702 of manufacture, such as a computer, a memory system, a magnetic or optical disk, some other storage device, and/or any type of electronic device or system may include one or more processors 704 coupled to a machine-readable medium 708 such as a memory (e.g., removable storage media, as well as any memory including an electrical, optical, or electromagnetic conductor) having instructions 712 stored thereon (e.g., computer program instructions), which when executed by the one or more processors 704 result in the machine 700 performing any of the actions described with respect to the methods above.

Machine 700 may take the form of a computer system having a processor 704 coupled to a number of components directly, and/or using a bus 716. Thus, the machine 700 may be similar to or identical to the system 600 shown in FIG. 6.

Turning now to FIG. 7, it can be seen that the components of the machine 700 may include main memory 720, static or non-volatile memory 724, and mass storage 706. Other components coupled to the processor 704 may include an output device 728, such as a video display, an input device 732, such as a keyboard, and a cursor control device 736, such as a mouse. A network interface device 740 to couple the processor 704 and other components to a network 744 may also be coupled to the bus 716. The instructions 712 may further be transmitted or received over the network 744 via the network interface device 740 utilizing any one of a number of well-known transfer protocols (e.g., the HyperText Transfer Protocol). Any of these elements coupled to the bus 716 may be absent, present singly, or present in plural numbers, depending on the specific embodiment to be realized.

The processor 704, the memories 720, 724, and the storage device 706 may each include instructions 712 which, when executed, cause the machine 700 to perform any one or more of the methods described herein. In alternative embodiments, the machine 700 operates as a standalone device or may be connected (e.g., networked) to other machines. In a networked environment, the machine 700 may operate in the capacity of a server or a client machine in server-client network environment, or as a peer machine in a peer-to-peer (or distributed) network environment. The machine 700 may comprise a PC, a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine 700 is illustrated, the term "machine" shall also be taken to include any collection of machines that individually or jointly execute a set (or multiple sets) of instructions to perform any one or more of the methodologies discussed herein.

While the machine-readable medium 708 is shown as a single medium, the term "machine-readable medium" should be taken to include a single medium or multiple media (e.g., a centralized or distributed database, and/or associated caches and servers, and or a variety of storage media, such as the processor 704 registers, memories 720, 724, and the storage device 706) that store the one or more sets of instructions 712. The term "machine-readable medium" shall also be taken to include any medium that is capable of storing, encoding or carrying a set of instructions for execution by the machine and that cause the machine 700 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Conclusion

Implementing the apparatus, systems, and methods of the various embodiments described herein may provide more efficient storage and transmission of word lists that can be used for spell-checking and other activities. Improved production speed and user satisfaction with various application programs may result.

Although embodiments of the invention have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those of ordinary skill in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method, comprising:
   constructing, by a server, a dictionary as a prefix tree having key strings associated with a plurality of nodes interconnected via branches, the plurality of nodes including at least one branch node coupled via some of the branches to sibling nodes of the branch node and child nodes of the branch node;
   assigning, by the server, a sequence of reference numbers to the plurality of nodes in a monotonic progression as the prefix tree is traversed along the plurality of nodes;
      wherein a sibling node of a branch node of the prefix tree is assigned a reference number that is positioned in the sequence of reference numbers after a reference number assigned to the branch node but before a reference number assigned to any child nodes of the branch node; and
      wherein multiple child nodes of the branch node are assigned reference numbers according to an order of appearance of characters in the key strings; and
   transforming the prefix tree into a string array based on the assigned reference numbers;
   searching for a word formed by concatenating the characters included in the key strings along a path defined by some of the plurality of nodes and the branches; and
   upon failing to find the word, displaying a list of suggested words according to a non-repeating list of the characters by inserting possible missing characters and replacing possible mistaken characters with possible intended substitute characters, the possible missing characters and the possible intended substitute characters included in the non-repeating list of the characters.

2. The method of claim 1, wherein constructing the dictionary comprises:
   constructing the prefix tree as a directed acyclic graph with at least one of the child nodes comprising a redirect node that is associated with one of the key strings including a redirect indicator character and one of the references numbers assigned to an assigned node of the plurality of nodes so that searches may be redirected from the redirect node to the assigned node.

3. The method of claim 2, wherein the dictionary comprises words selected from a non-English language.

4. The method of claim 1, wherein constructing the dictionary comprises:
   constructing the prefix tree as a directed acyclic graph with at least one of the child nodes comprising a chain node associated with one of the key strings including a plurality of alphabetic characters and coupled to either one or zero additional child nodes by the branches.

5. The method of claim 1, wherein alphabetic characters within a first group of the key strings are ordered according to a first letter frequency, and wherein alphabetic characters within a second group of the key strings are ordered according to a second letter frequency.

6. The method of claim 1, comprising:
   at least one of displaying an error message to a user when a word in a document cannot be constructed by traversing the prefix tree along a path defined by some of the plurality of nodes and the branches, or displaying a suggested automatic completion of the word.

7. A computer implemented method, comprising:
   retrieving data, by a data access module, from a first array constructed from a directed acyclic graph formed as a prefix tree having key strings associated with a plurality of nodes interconnected via branches, the plurality of nodes including at least one branch node coupled via some of the branches to sibling nodes of the branch node and child nodes of the branch node, wherein a sibling node of a branch node of the prefix tree is assigned a reference number that is positioned in a sequence of reference numbers after a reference number assigned to the branch node but before a reference number assigned to any child nodes of the branch node, and multiple child nodes of the branch node are assigned reference numbers according to an order of appearance of characters in the key strings; and forming a second array as a linear searchable index derived from the data, by an index construction module, with each element of the second array representing an index of a first child of each of the plurality of nodes;

searching for a word formed by concatenating the characters included in the key strings along a path defined by some of the plurality of nodes and the branches; and upon failing to find the word, displaying a list of suggested words according to a non-repeating list of the characters by inserting possible missing characters and replacing possible mistaken characters with possible intended substitute characters, the possible missing characters and the possible intended substitute characters included in the non-repeating list of the characters.

8. The method of claim 7, comprising:
adding, to the first array, an element comprising the non-repeating list of the characters.

9. The method of claim 7, comprising:
designating some nodes of the plurality of nodes as a chain node by including a chain node indicator in the key string associated with the chain node.

10. The method of claim 9, comprising:
using a termination character in the key string associated with the chain node.

11. The method of claim 7, wherein forming the second array comprises:
forming the second array each time execution of a word processing application program is initiated, or language within the word processing application program is changed.

12. The method of claim 11, wherein at least one of the child nodes comprises:
a redirect node that is associated with one of the key strings including a redirect indicator character and one of the references numbers assigned to an assigned node of the plurality of nodes so that searches may be redirected from the redirect node to the assigned node.

13. The method of claim 7, comprising:
converting the reference numbers to a string representation having a radix of 10 to 40.

14. A system, comprising:
a display;
an index construction module to form a second array as a linear searchable index derived from a first array constructed from a directed acyclic graph formed as a prefix tree having key strings associated with a plurality of nodes interconnected via branches, the plurality of nodes including at least one branch node coupled via some of the branches to sibling nodes of the branch node and child nodes of the branch node, wherein a sibling node of a branch node of the prefix tree is assigned a reference number that is positioned in a sequence of reference numbers after a reference number assigned to the branch node but before a reference number assigned to any child nodes of the branch node, and multiple child nodes of the branch node are assigned reference numbers according to an order of appearance of characters in the key strings; and a rendering module to display words on the display after the words have been checked for spelling against a concatenation created by concatenating characters included in the key strings along a path defined by some of the plurality of nodes and the branches, upon failing to find a word, the displayed words including a list of suggested words created by inserting possible missing characters and replacing possible mistaken characters with possible intended substitute characters.

15. The system of claim 14, comprising:
a user input device;
a processor coupled to the display; and
a storage device to store a word processing application program which, when executed by the processor, is used to receive the words via the user input device.

16. The system of claim 14, comprising:
a server to store at least one of the first array or the second array; and
a client coupled to the server via a network, the client to receive the words via a user input device coupled to the client.

17. The system of claim 14, comprising:
a server to construct the first array; and
a client to form the second array, the client capable of being coupled to the server via a network, the client to receive the words via a user input device coupled to the client.

18. A non-transitory computer-readable storage medium having instructions stored therein for causing a computer to implement a method, comprising:
retrieving data from a first array constructed from a directed acyclic graph formed as a prefix tree having key strings associated with a plurality of nodes interconnected via branches, the plurality of nodes including at least one branch node coupled via some of the branches to sibling nodes of the branch node and child nodes of the branch node, wherein a sibling node of a branch node of the prefix tree is assigned a reference number that is positioned in a sequence of reference numbers after a reference number assigned to the branch node but before a reference number assigned to any child nodes of the branch node, and multiple child nodes of the branch node are assigned reference numbers according to an order of appearance of characters in the key strings; and forming a second array as a linear searchable index derived from the data, with each element of the second array representing an index of a first child of each of the plurality of nodes;

searching for a word formed by concatenating the characters included in the key strings along a path defined by some of the plurality of nodes and the branches; and upon failing to find the word, displaying a list of suggested words according to a non-repeating list of the characters by inserting possible missing characters and replacing possible mistaken characters with possible intended substitute characters, the possible missing characters and the possible intended substitute characters included in the non-repeating list of the characters.

19. The medium of claim 18, the method comprising:
sorting the characters in the key strings according to a frequency of occurrence.

20. The medium of claim 18, the method comprising:
storing the second array in memory after initiating execution of an application program; and
deleting the second array from the memory about the same time as the execution is terminated.

21. The medium of claim 18, the method comprising:
designating some of the plurality of nodes as redirect nodes pointing to other nodes in the plurality of nodes, the reference numbers corresponding to line numbers of the first array, the redirect nodes associated with the key strings including the reference numbers assigned to the other nodes.

* * * * *